US006733072B2

(12) United States Patent  
Jaillet et al.

(10) Patent No.: US 6,733,072 B2
(45) Date of Patent: May 11, 2004

(54) PADDED ELEMENT FOR A VEHICLE, AND A METHOD OF MANUFACTURING IT

(75) Inventors: Laurent Jaillet, Guillerval (FR); Hervé Rancon, Bondoufle (FR); Jérôme Senechal, Boynes (FR); Nordine Edouibi, Etampes (FR)

(73) Assignee: Faurecia Sieges d'Automobile, Boulogne (FR)

( * ) Notice: Subject to any disclaimer, the term of this patent is extended or adjusted under 35 U.S.C. 154(b) by 41 days.

(21) Appl. No.: 10/000,611

(22) Filed: Oct. 24, 2001

(65) Prior Publication Data

US 2002/0067064 A1 Jun. 6, 2002

(30) Foreign Application Priority Data

Oct. 31, 2000 (FR) .............................. 00 13995

(51) Int. Cl.⁷ .......................... A47C 31/00; A47C 7/02; A47C 20/02; A47C 17/00
(52) U.S. Cl. .......................... 297/180.13; 297/180.12; 297/180.14; 297/452.27; 5/653; 5/740; 5/655.9
(58) Field of Search ................. 297/180.13, 180.12, 297/180.14, 452.17; 5/653, 740, 655.9

(56) References Cited

U.S. PATENT DOCUMENTS

| | | | | |
|---|---|---|---|---|
| 3,000,020 A | * | 9/1961 | Lombard et al. ............... 5/653 |
| 3,118,153 A | * | 1/1964 | Hood .......................... 428/218 |
| 3,310,300 A | * | 3/1967 | Lawson ....................... 267/111 |
| 4,044,221 A | * | 8/1977 | Kuhn .......................... 219/217 |
| 4,316,298 A | * | 2/1982 | Russo et al. .................... 5/722 |
| 4,544,598 A | * | 10/1985 | Meiller et al. ............... 442/223 |
| 4,869,550 A | | 9/1989 | Lorenzen et al. ............. 297/180 |
| 5,085,487 A | * | 2/1992 | Weingartner et al. ..... 297/452.1 |
| 5,850,645 A | * | 12/1998 | Ogawa et al. ................... 5/653 |
| 6,226,819 B1 | * | 5/2001 | Ogawa et al. ................... 5/653 |
| 6,247,751 B1 | * | 6/2001 | Faust et al. ............. 297/180.13 |
| 6,295,674 B1 | * | 10/2001 | Smith-McKelvey et al. ... 5/690 |
| 6,481,801 B1 | * | 11/2002 | Schmale .................. 297/452.27 |

FOREIGN PATENT DOCUMENTS

| | | |
|---|---|---|
| DE | 196 01 969 | 5/1998 |
| DE | 196 46 480 | 5/1998 |
| EP | 0 143 742 | 6/1985 |
| WO | WO 95/05766 | 3/1995 |

\* cited by examiner

Primary Examiner—Peter M. Cuomo
Assistant Examiner—Sarah C. Burnham
(74) Attorney, Agent, or Firm—McCracken & Frank LLP

(57) ABSTRACT

A padded element for a vehicle, the element comprising padding of flexible synthetic foam which supports a flexible member and which presents a support face for coming to bear against a user, said support face being covered by:

a film suitable for providing a barrier against the synthetic foam before it polymerized;

a first compressible flexible layer covering the film on its side opposite side to the padding and presenting permeability to air of less than 200 $l.m^{-2}.s^{-1}$ under a pressure difference of 100 Pa, and presenting a load-bearing capacity of 5 kPa;

a second flexible layer presenting a load-bearing capacity of 12 kPa; and a flexible outer decorative covering.

10 Claims, 2 Drawing Sheets

PADDED ELEMENT FOR A VEHICLE, AND A METHOD OF MANUFACTURING IT

FIELD OF THE INVENTION

The present invention relates to a padded elements for vehicles and to methods of manufacturing them.

More particularly, the invention relates to a padded element for a vehicle, the element comprising flexible synthetic foam padding supporting at least one flexible member that is less flexible than the foam and that presents a support face for a user to bear against, said support face being covered by a flexible outer decorative covering, and a flexible lining being interposed between the flexible member and the outer decorative covering.

Way of non-limiting example, the flexible member under consideration herein can be constituted in particular by:
  one or more plies of electric wires constituting in particular a sensor (to sense the presence of a user, to measure the weight of the user, etc.), an electric ply for heating, etc.;
  one or more semirigid sheets of plastics material or the like containing or supporting such plies of wires or containing other types of electrical component, etc.

BACKGROUND OF THE INVENTION

Document DE-A-196 01 969 describes an example of such a seat element, in which the flexible lining is constituted by a layer of foam forming part of the padding, the flexible member being embedded in the foam of the padding while the foam is polymerizing in a mold.

Nevertheless that technique does not present a sufficient guarantee that the layer of foam will be formed completely between the flexible member and the outer decorative covering, insofar as there is a major risk of the foam polymerizing before it fills the space that extends between the bottom of the mold and said flexible member. Under such circumstances, the above-mentioned flexible lining is incomplete, thereby degrading the comfort of the seat element since the occupant of the seat can then feel the presence of the flexible member under the decorative covering. In addition, localized gaps in the foam produce points of weakness in the padding which lead to accelerated degradation of the padding over time, and thus to a shorter lifetime for the seat element.

OBJECTS AND SUMMARY OF THE INVENTION

A particular object of the present invention is to mitigate those drawbacks.

To this end, according to the invention, a seat element of the kind in question is characterized in that the lining is less than 20 millimeters (mm) thick and comprises superposed layers of flexible materials that are distinct from the foam constituting the padding, the flexible lining comprising at least:
  a film adapted to constitute a barrier against the synthetic foam prior to its polymerization, said film adhering to the synthetic foam; and
  at least a first compressible flexible layer covering the film on the opposite side to the padding and adhering to said film, the first flexible layer presenting:
    permeability to air that is less than 200 liters per square meter per second ($l.m^{-2}.s^{-1}$) under a pressure difference of 100 pascals (Pa);
    load-bearing capacity lying in the range 3 kPa to 12 kPa; and
    thickness lying in the range 1 mm to 10 mm.

By means of these dispositions, good comfort is ensured for the user who bears against the support face of the padding.

In preferred embodiments of the invention, use may optionally also be made of one or more of the following dispositions:
  the padding is made of polyurethane foam and the film comprises firstly a main component selected from polysaccharides and animal proteins, and secondly a plasticizing agent selected from: caprolactone, polylactic acid, cellophane, paper, polyethylene, and isocyanate;
  the first flexible layer is made of a material selected from synthetic foams and non-woven fabrics;
  the flexible lining further comprises a second compressible flexible layer interposed between the first flexible layer and the outer decorative covering, said second flexible layer adhering to said decorative covering and presenting:
    thickness lying in the range 1 mm to 6 mm; and
    load-bearing capacity lying in the range 5 kPa to 20 kPa;
  the second flexible layer is made of a material selected from synthetic foams and non-woven fabrics;
  the second flexible layer adheres to the first flexible layer;
  the flexible member adheres to the film;
  the outer decorative covering forms at least one reentrant line which penetrates into the padding, said padding supporting at least two flexible members adhering to the film of the flexible lining, said flexible members being placed on either side of the reentrant line and being interconnected via at least one flexible strap which forms a loop extending towards the inside of the padding away from the reentrant line formed by the outer decorative covering (in this embodiment, the adhesion of the flexible members on the flexible lining film guarantees that the strap in the form of a U-shaped loop is properly positioned before the padding is molded);
  the strap is spaced apart from the reentrant line of the outer decorative covering by the padding having a thickness of not less than 55 mm;
  the flexible lining and the outer decorative covering form a laminate having a total thickness of not more than 8 mm; and
  the padded element constitutes a seat element.

The invention also provides a method of manufacturing a padded element as defined above, the method comprising the following steps:
  a) at least one flexible lining is placed in a mold defining a bottom cavity, the film being placed towards said cavity and the flexible member adhering to the film;
  b) suction is established in the mold pressing said flexible lining against the mold;
  c) flexible synthetic foam in the still unpolymerized state is cast into the mold cavity against the film of the flexible lining; and
  d) the synthetic foam is allowed to polymerize.

Advantageously, during step a), a laminate is placed in the mold, the laminate comprising both the flexible padding and the outer decorative covering.

BRIEF DESCRIPTION OF THE DRAWINGS

Other characteristics and advantages of the invention will appear on reading the following description of embodiments thereof, given by way of non-limiting example and with reference to the accompanying drawings. In the drawings.

MORE DETAILED DESCRIPTION

In the various figures, the same references designate elements that are identical or similar.

Figure 1:
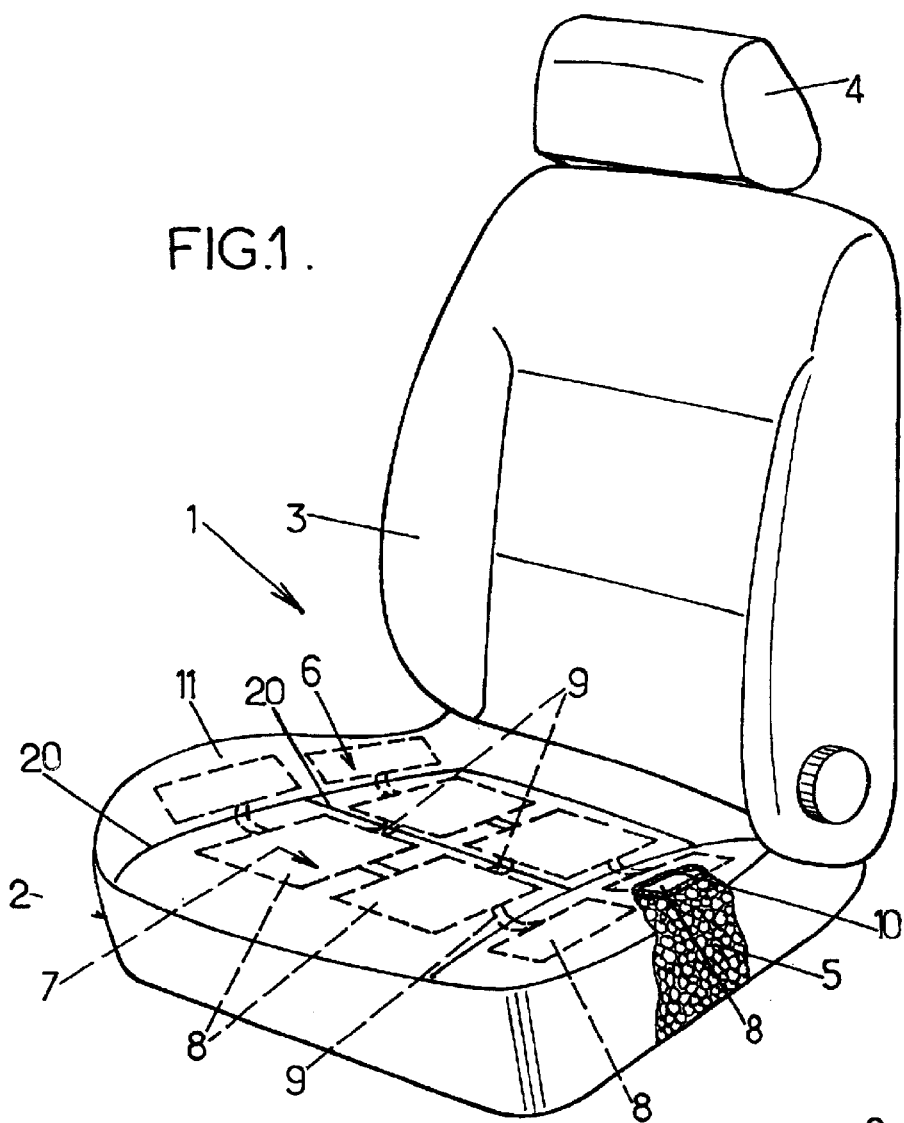
FIG. 1 is a partially cutaway perspective view of a seat in which the seat proper is made in accordance with the invention.

FIG. 1 shows a motor vehicle seat 1 comprising a seat proper 2, a seat back 3, and a headrest 4.

The seat proper 2 comprises molded synthetic foam padding 5, in particular made of polyurethane foam.

The padding 5 has a top face 6 or "support" face against which a user sitting on the seat comes to bear. This top face 6 of the padding includes electrical or other equipment 7 which, in the example described comprises a plurality of flexible sheets of plastics material 8 placed at the surface of the padding 5 and interconnected by flexible straps 9. The sheets 8 and the straps 9 are preferably made from a single sheet of plastics material which is cut out and perforated. The sheets 8 can constitute electromagnetic (or capacitive, or other) sensors, for example, for the purpose of detecting the presence, the posture, or the weight of a user sitting on the seat, in which case the straps 9 can form electrical connections between the various sheets 8.

In a variant, the equipment 7 can be replaced by a ply of electric wires, in particular a heating ply, or by any other flexible member or set of flexible members, preferably presenting a certain amount of flexibility, but less flexible than the foam of the padding 5.

To ensure that a user sitting on the seat 1 remains comfortable, the electrical equipment 7 is covered in a flexible lining 10 of small thickness which presents sufficient load-bearing capacity to ensure that the user preferably does not feel the various sheets 8 of semirigid material.

This flexible lining 10 is covered by an outer decorative covering 11 of textile, leather, or similar material, which in the present example is integral with the lining 10.

Figure 2:
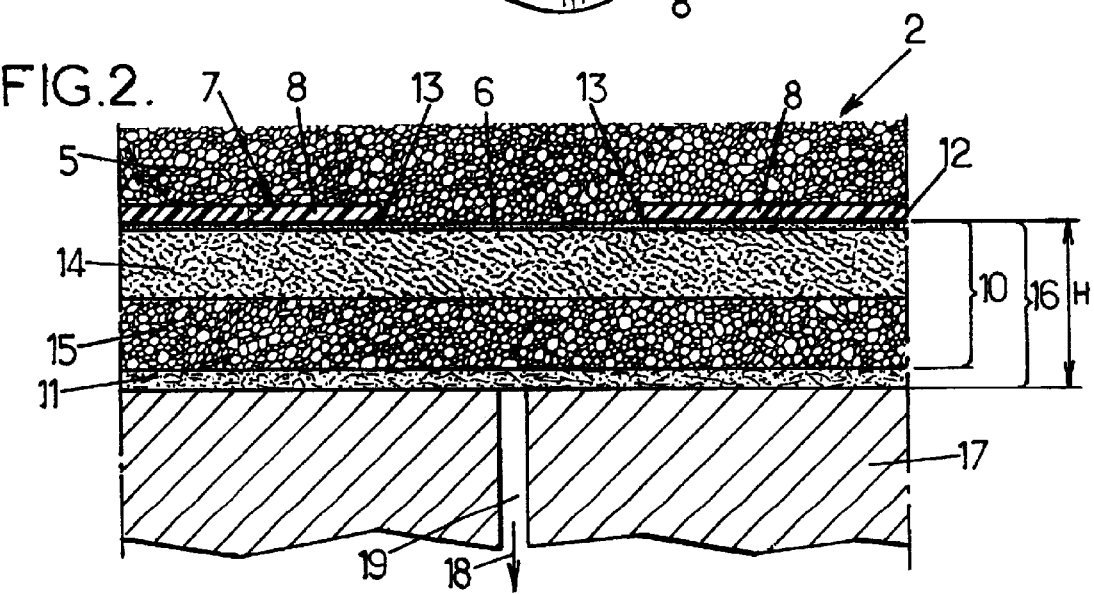
FIG. 2 is a fragmentary section view through the seat proper of the FIG. 1 seat during molding.

More precisely, as shown in FIG. 2, the flexible lining 10 comprises a flexible film 12 which covers the top surface 6 of the padding 5 and the sheets 8, and which can advantageously be stuck to the sheets 8 by means of a layer of adhesive 13.

The flexible film can be of a thickness lying in the range 1 micrometer ($\mu$m) to 50 $\mu$m for example, and in particular in the range 15 $\mu$m to 50 $\mu$m, and it can be made on the basis of polysaccharides or of animal proteins associated with a plasticizing agent such as: caprolactone, polylactic acid, cellophane, paper, polyethylene, isocyanate, etc., with the polysaccharides and/or animal proteins constituting 50% to 90% by weight of the film 12.

This type of film 12 serves at least temporarily to provide a barrier against the polyurethane foam of the padding 5 prior to polymerization, while also reacting with the polyurethane foam. Finally, the film 12 advantageously presents permeability to air (measured in application of standard NF EN ISO 4638) of less than 1 $l.m^{-2}.s^{-1}$ and permeability to water vapor that is sufficient to guarantee that a user of the seat 1 experiences good hygrothermal comfort.

Furthermore, the flexible lining 10 also includes a first compressible flexible layer 14 which covers the film 12 towards the outside of the seat and which is made of polyurethane foam, non-crosslinked synthetic foam, non-woven fabric, etc. for example. The first flexible layer 14 is stuck to the film 12, e.g. by flame treatment (partial melting of the layer 14 using a flame, followed by immediate application against the film 12), etc. The first flexible layer 14 preferably presents the following characteristics:

thickness lying in the range 1 mm to 5 mm, and advantageously in the range 1.3 mm to 4 mm;

permeability to air under suction of 100 Pa less than 200 $l.m^{-2}.s^{-1}$, e.g. less than or equal to 100 $l.m^{-2}.s^{-1}$, where said permeability is measured in application of standard NF EN ISO 4638 with a cell having an area of 25 square centimeters ($cm^2$); and load-bearing capacity lying in the range 3 kPa to 12 kPa, and advantageously about 5 kPa.

In the meaning of the present patent application, "load-bearing capacity" is a magnitude that is measured as follows:

the initial thickness $H_0$ of the flexible layer 14 is measured while said layer is substantially uncompressed;

four successive cycles of compression are applied to the flexible layer 14 down to a thickness $H_1 = 0.75 \times H_0$; and the flexible layer 14 is compressed down to a thickness $H_2 = 0.5 \times H_0$ and the pressure applied to the flexible layer to reach this thickness is measured, with said pressure constituting the above-mentioned load-bearing capacity.

Finally, the flexible lining 10 has a second compressible flexible layer 15 interposed between the layer 14 and the outer decorative covering 11. This second flexible layer 15 is made, for example, out of polyurethane foam, non-crosslinked synthetic foam, non-woven fabric, etc., and it is advantageously assembled both to the decorative covering 11 and to the first flexible layer 14, e.g. by flame or other treatment.

This second flexible layer 15 advantageously presents the following characteristics:

thickness lying in the range 1 mm to 6 mm, and advantageously lying in the range 1.5 mm to 5.5 mm; and load-bearing capacity (measured as described above) lying in the range 5 kPa to 20 kPa, for example being about 12 kPa.

The film 12, the flexible layers 14 and 15, and the decorative covering 11 together form a one-piece laminate 16 which advantageously presents a total thickness H that is less than or equal to 8 mm.

While the padding 5 is being molded, as shown in FIG. 2, the laminate 16 is laid on the bottom of the mold 17.

The flexible sheets 8 are stuck or possibly heat-sealed to the film 12, either at this stage, or previously, thus ensuring that the straps 9 are indeed in a U-shape prior to casting the polyurethane foam 5.

Thereafter, the polyurethane foam 5, while still in the non-polymerized fluid state, is cast into the mold 17 against the film 12.

During this operation, suction is established through the bottom of the mold 17 by sucking air in the direction of arrow 18 via one or more ducts 19 formed through the mold. As a result, and given the low permeability to air of the flexible layer 14 and of the film 12, the entire laminate 16 is pressed against the bottom of the mold 17 and takes up accurately the shape of said mold.

During polymerization, the polyurethane foam 5 is stopped by the film 12 and therefore does not penetrate significantly into the flexible layer 14 or into the other layers of the laminate 16, which thus retain their flexibility characteristics in full. The foam 5 does, however, react with the film 12, thereby bonding the foam to the layer 14.

Furthermore, because the sheets 8 or other flexible members belonging to the equipment 7 are stuck to the film 12, little or no non-expanded foam accumulates between said sheets 8 and the film 12, which avoids creating hard points that are uncomfortable for the user.

Figure 3:
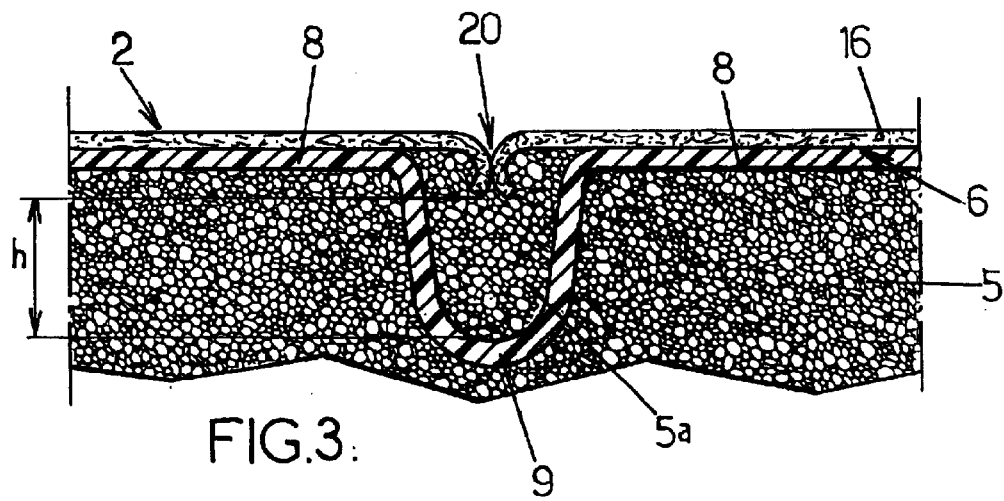
FIG. 3 is a detail section view of the seat proper of the FIG. 1 seat after molding.

In addition, at the locations where the straps 9 that interconnect the various sheets 8 pass beneath reentrant lines 20 (see FIGS. 1 and 3) where the laminate 16 penetrates into the foam 5, it is preferable to ensure a height h of not less than 55 mm between the lowest point of the laminate 16 in register with the reentrant line 20 and the low point of the corresponding strap 9, where these two low points are disposed mutually in register. This guarantees that foam penetrates and expands properly between the strap 9 and the laminate 16 in register with the reentrant line 16, thereby improving the comfort provided by the seat.

It should also be observed that the flexible layer 15 could, where appropriate, be omitted, in which case the flexible layer 14 could be of a thickness of as much as 10 mm, for example.

Figure 4:
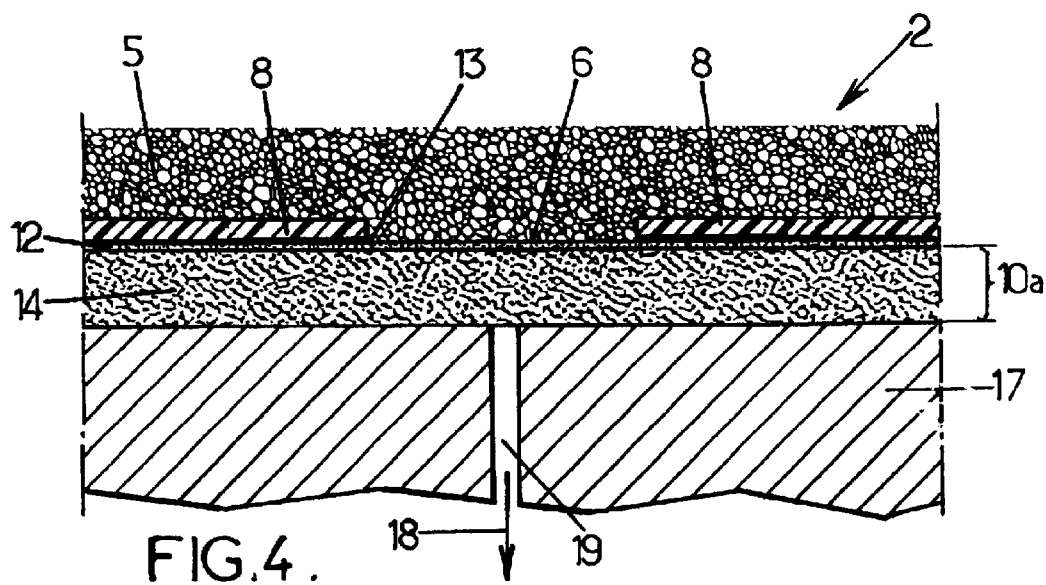
FIG. 4 is a view similar to FIG. 2, showing a second embodiment of the invention.

As shown in FIG. 4, it is possible to mold the padding 5 of the seat proper solely with the film 12 and the first flexible layer 14 which then constitutes the flexible lining 10a, in which case the decorative covering 11 and the flexible layer 15 are secured to each other and constitute a fitted cover 21 covering the first flexible layer 14, this fitted cover being put into place on the seat proper 2 after the padding 5 has been molded.

Figure 5:
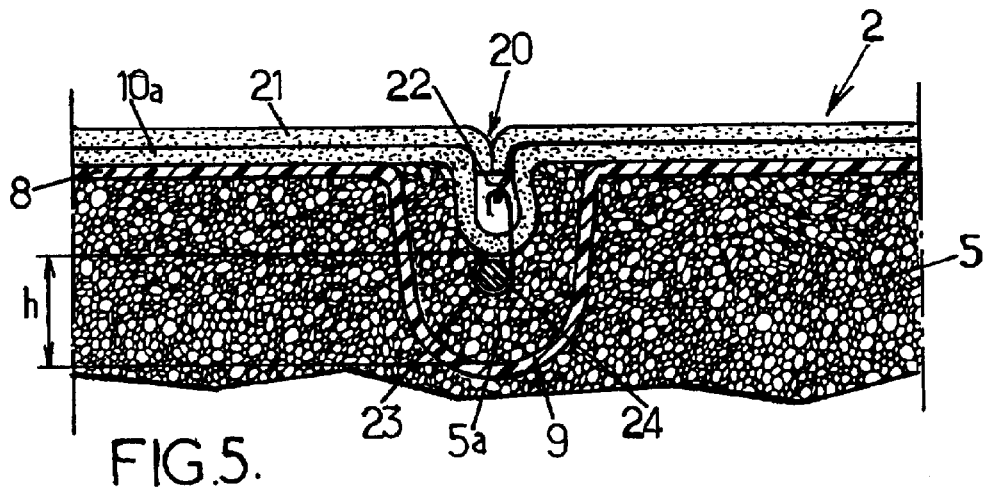
FIG. 5 is a view similar to FIG. 3, in the second embodiment of the invention.

Under such circumstances, and as shown in FIG. 5, the reentrant lines or return lines 20 of the cover 21 can, for example, include flexible strips 22 secured by metal hooks or other fasteners 23 to inserts 24 such as metal wires etc. partially embedded in the foam forming the padding 5.

As described above, because the flexible sheets 8 are stuck to the film 12 of the lining 10a, the flexible straps 9 which interconnect the sheets 8 are guaranteed to present a U-loop shape which ensures that the minimum thickness h of foam is preferably greater than or equal to 55 mm above the bottom portion of the flexible strap 9.

Finally, it can be observed that the invention also applies to making a seat back 3, a headrest 4, or indeed any other padded element forming part of a vehicle cabin.

We is claimed is:

1. A padded element for a vehicle, the element comprising flexible synthetic foam padding supporting at least one flexible member that is less flexible than the foam and that presents a support face for a user to bear against, said support face being covered by a flexible outer decorative covering, and a flexible lining being interposed between the flexible member and the outer decorative covering,
   wherein the lining is less than 20 mm thick and comprises superposed layers of flexible materials that are distinct from the foam constituting the padding, the flexible lining comprising at least:
      a film adapted to constitute a barrier against the synthetic foam prior to its polymerization, said film adhering to the synthetic foam;
      at least a first compressible flexible layer covering the film opposite to the padding and adhering to said film, the first flexible layer presenting:
         permeability to air that is less than 200 $1.m^{-2}.s^{-1}$ under a pressure difference of 100 Pa;
         load-bearing capacity lying in the range 3 kPa to 12 kPa;
         thickness lying in the range 1 mm to 10 mm; and
      a second compressible flexible layer interposed between the first flexible layer and the outer decorative covering, said second flexible layer adhering to said decorative covering and presenting:
         thickness lying in the range 1 mm to 6 mm; and
         load-bearing capacity lying in the range 5 kPa to 20 kPa.

2. A padded element according to claim 1, in which the padding is made of polyurethane foam and the film comprises firstly a main component selected from polysaccharides and animal proteins, and secondly a plasticizing agent selected from: caprolactone, polylactic acid, cellophane, paper, polyethylene, and isocyanate.

3. A padded element according to claim 1, in which the first flexible layer is made of a material selected fmm synthetic foams and non-woven fabrics.

4. A padded element according to claim 1, in which the second flexible layer is made of a material selected from synthetic foams and non-woven fabrics.

5. A padded element according to claim 1, in which the second flexible layer adheres to the first flexible layer.

6. A padded element according to claim 1, in which the flexible member adheres to the film through a layer of adhesive.

7. A padded element according to claim 1, in which the flexible lining and the outer decorative covering form a laminate having a total thickness of not more than 8 mm.

8. A padded element according to claim 1, constituting a seat element.

9. A padded element for a vehicle, the element comprising flexible synthetic foam padding supporting at least one flexible member that is less flexible than the foam and that presents a support face for a user to bear against, said support face being covered by a flexible outer decorative covering, and a flexible lining being interposed between the flexible member and the outer decorative covering,
   wherein the lining is less than 20 mm thick and comprises superposed layers of flexible materials that are distinct from the foam constituting the padding, the flexible lining comprising at least:
      a film adapted to constitute a barrier against the synthetic foam prior to its polymerization, said film adhering to the synthetic foam; and
      at least a first compressible flexible layer covering the film opposite to the padding and adhering to said film, the first flexible layer presenting:
         permeability to air that is less than 200 $1.m^{-2}.s^{-1}$ under a pressure difference of 100 Pa;
         load-bearing capacity lying in the range 3 kPa to 12 kPa;
         thickness lying in the range 1 mm to 10 mm;
   wherein the outer decorative covering forms at least one reentrant line which penetrates into the padding, said padding supporting at least two flexible members adhering to the film of the flexible lining, said flexible members being placed on either side of the reentrant line and being interconnected via at least one flexible strap which forms a loop extending towards the padding away from the reentrant line formed by the outer decorative covering.

10. A padded element according to claim 9, in which the strap is spaced apart from the reentrant line of the outer decorative covering by the padding having a thickness of not less than 55 mm.

* * * * *